United States Patent [19]

Oxman et al.

[11] Patent Number: 4,828,583
[45] Date of Patent: * May 9, 1989

[54] COATED ABRASIVE BINDER CONTAINING TERNARY PHOTOINITIATOR SYSTEM

[75] Inventors: Joel D. Oxman, Minneapolis; F. Andrew Ubel, III, St. Paul; Eric G. Larson, White Bear Lake, all of Minn.

[73] Assignee: Minnesota Mining and Manufacturing Company, St. Paul, Minn.

[*] Notice: The portion of the term of this patent subsequent to Apr. 5, 2005 has been disclaimed.

[21] Appl. No.: 156,992

[22] Filed: Feb. 18, 1988

Related U.S. Application Data

[63] Continuation-in-part of Ser. No. 34,066, Apr. 2, 1987, Pat. No. 4,735,632.

[51] Int. Cl.$^4$ .......................................... B24D 11/00
[52] U.S. Cl. ........................................ 51/295; 51/293; 51/298; 430/332
[58] Field of Search ................. 51/293, 298; 1/295; 430/332, 340

[56] References Cited

U.S. PATENT DOCUMENTS

| | | | |
|---|---|---|---|
| 3,427,161 | 2/1969 | Urbain | 96/35.1 |
| 3,729,313 | 4/1973 | Smith | 430/332 |
| 3,741,769 | 6/1973 | Smith | 96/35.1 |
| 3,756,827 | 9/1973 | Chang | 96/86 P |
| 3,759,807 | 9/1973 | Osborn | 204/159.23 |
| 3,808,006 | 4/1974 | Smith | 96/88 |
| 4,011,063 | 3/1977 | Johnston | 51/295 |
| 4,047,903 | 9/1977 | Hesse et al. | 51/295 |
| 4,071,424 | 1/1978 | Dart | 204/159.15 |
| 4,126,428 | 11/1978 | Rude | 51/295 |
| 4,156,035 | 5/1979 | Tsao et al. | 427/44 |
| 4,228,232 | 10/1980 | Rousseau | 430/271 |
| 4,240,807 | 12/1980 | Kronzer | 51/295 |
| 4,250,053 | 2/1981 | Smith | 252/426 |
| 4,298,356 | 11/1981 | Teschner et al. | 51/295 |
| 4,394,403 | 7/1983 | Smith | 427/42 |
| 4,407,984 | 10/1983 | Radcliffe et al. | 523/115 |
| 4,428,807 | 1/1984 | Lee et al. | 204/159.14 |
| 4,457,766 | 7/1984 | Caul | 51/298 |
| 4,503,169 | 3/1985 | Randklev | 523/117 |
| 4,535,052 | 8/1985 | Anderson et al. | 430/277 |
| 4,547,204 | 10/1985 | Caul | 51/298 |
| 4,642,126 | 2/1987 | Zadar et al. | 51/298 |
| 4,652,274 | 3/1987 | Boettcher et al. | 51/293 |

FOREIGN PATENT DOCUMENTS 0150952 8/1985 European Pat. Off. .
1304112 1/1973 United Kingdom .

OTHER PUBLICATIONS

Baumann, H. U. Oertel and H. J. Timpe, *Euro. Polym. J.*, 22 (4), 313 (Apr. 3, 1986), Translation enclosed.
Baumann, H., B. Strehmel, H. J. Timpe and U. Lammel, *J. Prakt. Chem.*, 326, (3), 415–425 (1984), Translation enclosed.
*Bull. Chem. Soc., Japan*, 42, 2924–2930, (1969).
*Chem. Abs.* 95:225704U.
Mann, C. K. and Barnes, K. K., *Electrochemical Reactions in Nonaqueous Systems* (1970).
Timpe, H. J. and Baumann, H., *Wiss. Z. Tech. Hochsch. Leunn–Merseberg*, 26, 439 (1984), Translation enclosed.
Weinberg, N. L., Ed., *Technique of Electroorganic Synthesis Part II Techniques of Chemistry*, vol. VP 8, (1975).
Crivello, J. V. and Lam, J. K. W., *Journal of Polymer Science: Polymer Letters*, Edition, 17, 759–64 (1979).
Crivello, J. V., Lee, J. L. and Conlon, D. A., *J. Rad. Curing*, 10 (1), 6–13 (Jan. 1983).
Gatechair, L. R. and Pappas, S. P., *Organic Coatings and Applied Polymer Science Proceedings*, 46, 701–707 (ACS, 183rd National Meeting, Las Vegas, Nev., Mar. 29, 1982.
Perkins, W. C., *J. Rad. Curing*, 8, (1), 1623 (Jan. 1981).
"Abrasives", *Kirk Othmer Encyclopedia of Chemical Technology*, 3rd Ed., 6, 26–52 (1978).

*Primary Examiner*—A. Lionel Clingman
*Assistant Examiner*—Willie J. Thompson
*Attorney, Agent, or Firm*—Donald M. Sell; Walter N. Kirn; David R. Cleveland

[57] ABSTRACT

Coated abrasive binders made from a photocurable addition-polymerizable composition containing a free-radically-polymerizable monomer and a photoinitiator system containing (i) an arylidonium salt, (ii) a sensitizing compound, and (iii) an electron donor having an oxidation potential that is greater than zero and less than or equal to that of p-dimethyoxybenzene (1.32 volts vs. S.C.E.). The binders cure rapidly and deeply under ultraviolet or visible light, even when filled with large amounts of mineral grain or with coarse grades of minerals.

28 Claims, No Drawings

COATED ABRASIVE BINDER CONTAINING TERNARY PHOTOINITIATOR SYSTEM

CROSS-REFERENCE TO RELATED APPLICATION

This application is a continuation-in-part of application Ser. No. 34,066, filed Apr. 2, 1987 U.S. Pat. No. 4,735,632.

TECHNICAL FIELD

This invention relates to coated abrasives made using photochemically initiated binders.

BACKGROUND ART

When coated abrasives are made from conventional binders such as hide glue, varnish or phenolic resins, the manufacturing process can be both energy-intensive and time-consuming. For example, the widely-used phenolic binders must be dried at high temperatures for long times (e.g., at least about 2 hours at 90° C. (1956° F.) for cure of phenolic size coatings). In an effort to reduce energy consumption and increase throughput, coated abrasive manufacturers have investigated electron-beam ("E-beam")-curable binders and photochemically-curable binders, e.g., as described in recently-issued U.S. Pat. Nos. 4,642,126 and 4,652,274.

A general shortcoming of radiation curing as applied to coated abrasive manufacture lies in the inherent difficulty of curing behind an abrasive grain in highly-filled or thick-section coated abrasive products. As a result, the abrasive grains may be poorly adhered on the backing or carrier, with concomitant poor product performance. Combinations of E-beam cure and thermally-initiated cure have been employed to overcome this shortcoming; however, such an approach still represents a compromise solution that can require considerable time and energy for completion of a thermal cure cycle.

Aryliodonium salts have been previously described for use as photoinitiators in addition-polymerizable compositions. References relating to such compositions include U.S. Pat. Nos. 3,729,313, 3,741,769, 3,808,006, 4,228,232, 4,250,053 and 4,428,807; H.J. Timpe and H. Baumann, Wiss, Z. Tech. Hochsch. Leuna-Merseburg, 26, 439 (1984); H. Baumann, B. Strehmel, H. J. Timpe and U. Lammel, J. Prakt. Chem, 326 (3), 415 (1984); and H. Baumann, U. Oertel and H. J. Timpe, Euro. Polym. J., 22 (4), 313 (Apr. 3, 1986).

Mono- and di-ketones have also previously been described for use as photoinitiators in addition-polymerizable compositions. References relating to such compositions include U.S. Pat. Nos. 3,427,161, 3,756,827, 3,759,807 and 4,071,424; U.K. Pat. No. 1,304,112; European Published Pat. Appl. No. 150,952 and Chem. Abs. 95:225704U.

SUMMARY OF THE INVENTION

The present invention provides, in one aspect, a coated abrasive article having abrasive granules which are supported on and adherently bonded to a carrier (e.g., a backing sheet or a nonwoven web) by a photocured binder made by photocuring an addition-polymerizable composition comprising:

(a) free-radically-polymerizable monomer ("monomer"), and (b) photoinitiator system, soluble in said monomer, comprising photochemically effective amounts of
 (i) diaryliodonium salt ("iodonium salt"),
 (ii) sensitizing compound ("sensitizer") capable of absorbing light somewhere within the range of wavelengths between about 300 and about 1000 nanometers and capable of sensitizing 2-methyl-4-,6-bis(trichloromethyl)-s-triazine, and
 (iii) electron donor compound ("donor"), said donor being different from said sensitizer and wherein zero $<E_{ox}$ (donor) $\leq E_{ox}$ (p-dimethoxybenzene).

The abrasive binders used in the invention have a very useful combination of cure speed, cure depth and shelf life. They cure well even when loaded with large amounts of mineral grain or with coarse grades of minerals.

The invention also provides a method for manufacturing coated abrasives.

DETAILED DESCRIPTION OF THE INVENTION

Aside from the abrasive binder (described in more detail below), the other components of the coated abrasive product of the invention can be selected from those typically used in the art. In that regard, see W. G. Pinkstone, "Abrasives", *Kirk-Othmer Encyclopedia of Chemical Technology*, 3d Ed., 6, 26–52 (1978). The backing can be formed of paper, resin-impregnated cloth, low density open web (e.g., a nonwoven web as in U.S. Pat. No. 2,958,593), vulcanized fiber, film or any other carrier capable of supporting abrasive grains. The abrasive granules can be of any conventional grade utilized in the formation of coated abrasives and can be formed of flint, garnet, aluminum oxide, alumina:zirconia, synthetic ceramic, diamond, silicon carbide, etc., or mixtures thereof. The frequency of the abrasive granules on the carrier and their average particle size and size distribution can be conventional. The abrasive granules can be oriented or can be applied to the carrier without orientation, depending upon the requirements of the particular coated abrasive product. On abrasive articles made using a make coat and a size coat, either the make coat or the size coat can be made using a conventional resinous material, the remaining coat being made using a photochemically-initiated binder of the invention. If desired, both the make and size coat of such abrasive articles can be made using a binder of the invention.

The use of the binder of the present invention avoids many of the problems that plague binders generally used in coated abrasives. The binder does not require prolonged heating and/or dwell times before subsequent coatings are applied to the make coat. Unlike glue, the cured binder of the invention is unaffected by moisture. In fact, coated abrasive products made from the binder of the invention perform well under wet grinding conditions. Unlike varnish, the binder of the invention can be applied with little or no solvent and can be cured in a much shorter processing time. Varnish softens during wet grinding while the binder of the invention is not deleteriously affected. Curing of the binder of the invention is accomplished much more rapidly than curing of phenolic resin.

The coated abrasive product of the invention can also include such modifications as are known in the art. For example, a back coating such as pressure-sensitive adhesive can be applied to the nonabrasive side of the backing and various supersizes can be applied to the abrasive surface, such as zinc stearate to prevent abrasive loading, and others.

Turning now to the composition of the binder, a wide variety of monomers can be employed. Suitable monomers contain at least one ethylenically-unsaturated double bond, can be oligomers, and are capable of undergoing addition polymerization. Such monomers include mono-, di- or poly- acrylates and methacrylates such as methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, trishydroxyethyl-isocyanurate triacrylate; the bis-acrylates and bis-methacrylates of polyethylene glycols of molecular weight 200-500, copolymerizable mixtures of acrylated monomers such as those of U.S. Pat. No. 4,652,274, and acrylated oligomers such as those of U.S. Pat. No. 4,642,126; unsaturated amides such as methylene bis-acrylamide, methylene bis-methacrylamide, 1,6-hexamethylene bis-acrylamide, diethylene triamine tris-acrylamide and beta-methacrylaminoethyl methacrylate; and vinyl compounds such as styrene, diallyl phthalate, divinyl succinate, divinyl adipate and divinylphthalate. Mixtures of two or more monomers can be used if desired.

The monomer is combined with a three component or ternary photoinitiator system. The first component in the photoinitiator system is the iodonium salt, i.e., a diaryliodonium salt. The iodonium salt should be soluble in the monomer and preferably is shelf-stable (i.e., does not spontaneously promote polymerization) when dissolved therein in the presence of the sensitizer and donor. Accordingly, selection of a particular iodonium salt may depend to some extent upon the particular monomer, sensitizer and donor chosen. Suitable iodonium salts are described in U.S. Pat. Nos. 3,729,313, 3,741,769, 3,808,006, 4,250,053 and 4,394,403, the iodonium salt disclosures of which are incorporated herein by reference. The iodonium salt can be a simple salt (e.g., containing an anion such as $Cl^-$, $Br^-$, $I^-$ or $C_6H_5SO_3^-$) or a metal complex salt (e.g., containing an anion such as $BF_4^-$, $PF_6^-$, $SbF_6^-$, $SbF_5OH^-$ or $AsF_6^-$). Mixtures of iodonium salts can be used if desired.

Preferred iodonium salts include diphenyliodonium salts such as diphenyliodonium chloride, diphenyliodonium hexafluorophosphate and diphenyliodonium tetrafluoroborate.

The second component in the photoinitiator system is the sensitizer. The sensitizer should be soluble in the monomer, and is capable of light absorption somewhere within the range of wavelengths between about 300 and about 1000 nanometers, more preferably about 400 and about 700 nanometers and most preferably about 400 to about 600 nanometers. The sensitizer is also capable of sensitizing 2-methyl-4,6-bis(trichloromethyl)-s-triazine, using the test procedure described in U.S. Pat. No. 3,729,313. Using currently available materials, that test is carried out as follows. A standard test solution is prepared having the following composition.

5.0 parts of 5% (weight by volume) solution in methanol of 45,000–55,000 molecular weight, 9.0–13.0% hydroxyl content polyvinyl butyral ("Butvar B76", Monsanto)

0.3 parts trimethylolpropane trimethacrylate 0.03 parts 2-methyl-4,6-bis(trichloromethyl)-s-triazine (see Bull. Chem. Soc. Japan, 42, 2924–2930, 1969).

To this solution is added 0.01 parts of the compound to be tested as a sensitizer. The solution is knife-coated onto a 0.05mm clear polyester film using a knife orifice of 0.05mm, and the coating is air dried for about 30 minutes. A 0.05mm clear polyester cover film is carefully placed over the dried but soft and tacky coating with minimum entrapment of air. The resulting sandwich construction is then exposed for three minutes to 161,000 Lux of incident light from a tungsten light source providing light in both the visible and ultraviolet range ("FCH" 650 watt quartz-iodine lamp, General Electric).

Exposure is made through a stencil so as to provide exposed and unexposed areas in the construction. After exposure the cover film is removed and the coating is treated with a finely divided colored powder, such as a color toner powder of the type conventionally used in xerography. If the tested compound is a sensitizer, the trimethylolpropane trimethacrylate monomer will be polymerized in the light-exposed areas by the light-generated free radicals from the 2-methyl-4,6-bis(trichloromethyl)-s-triazine. Since the polymerized areas will be essentially tack-free, the colored powder will selectively adhere only to the tacky, unexposed areas of the coating, providing a visual image corresponding to that in the stencil.

Preferably, in addition to passing the above test, a sensitizer is also selected based in part upon shelf stability considerations. Accordingly, selection of a particular sensitizer may depend to some extent upon the particular monomer, iodonium salt and donor chosen.

Suitable sensitizers are believed to include compounds in the following categories: ketones, coumarin dyes (e.g., ketocoumarins), xanthene dyes, acridine dyes, thiazole dyes, thiazine dyes, oxazine dyes, azine dyes, aminoketone dyes, porphyrins, aromatic polycyclic hydrocarbons, p-substituted aminostyryl ketone compounds, aminotriaryl methanes, merocyanines, squarylium dyes and pyridinium dyes. Ketones (e.g., monoketones or alpha-diketones) are preferred sensitizers. For applications requiring deep cure (e.g., cure of thick-section abrasives) it is preferred to employ sensitizers having an extinction coefficient below about 1000, more preferably below about 100, at the desired wavelength of irradiation for photopolymerization.

By way of example, a preferred class of ketone sensitizers has the formula: where X is CO or $CR^1R^2$, where $R^1$ and $R^2$ can be the same or different, and can be hydrogen, alkyl, alkaryl or aralkyl, b is zero or 1, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic, heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, ps di-2-thiophenyl ketone, benzoin, fluorenone, chalcone, Michler's ketone, 2-fluoro-9-fluorenone, 2-chlorothioxanthone, acetophenone, benzophenone, 1- or 2-acetonaphthone, 9-acetylanthracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7-, and 1,8-diacetylnaphthalene, 1,5-, 1,8- and 9,10-diacetylanthracene, and the like. Suitable α-diketones (b=1 and x=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-, 3,3'- and 4,4'-dihydroxylbenzil, furil, di-3,3'-indolylethanedione, 2,3-bornanedione (camphorquinone), biacetyl, 1,2-cyclohexanedione, 1,2-naphthaquinone, acenaphthaquinone, and the like.

The third component in the photoinitiator system is the electron donor. A wide variety of donors can be employed. The donor is soluble in the monomer, and should meet the oxidation potential ($E_{ox}$) limitation discussed in more detail below. Preferably, the donor also is selected based in part upon shelf stability considerations. Accordingly, selection of a particular donor may depend in part on the monomer, iodonium salt and sensitizer chosen. Suitable donors are capable of increasing the speed of cure or depth of cure of the binder of the invention upon exposure of light of the desired wavelength. Also, the donor has an $E_{ox}$ greater than zero and less than or equal to $E_{ox}$ (p-dimethoxybenzene). Preferably $E_{ox}$(donor) is between about 0.5 and 1 volts vs. a saturated calomel electrode ("S.C.E"). $E_{ox}$ (donor) values can be measured experimentally, or obtained from references such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970).

Preferred donors include amines (including aminoaldehydes and aminosilanes), amides (including phosphoramides), ethers (including thioethers), ureas (including thioureas), ferrocene, sulfinic acids and their salts, salts of ferrocyanide, ascorbic acid and its salts, dithiocarbamic acid and its salts, salts of xanthates, salts of ethylene diamine tetraacetic acid and salts of tetraphenylboronic acid. The donor can be unsubstituted or substituted with one or more non-interfering substituents. Particularly preferred donors contain an electron donor atom such as a nitrogen, oxygen, phosphorus, or sulfur atom, and an abstractable hydrogen atom bonded to a carbon or silicon atom alpha to the electron donor atom.

Preferred amine donor compounds include alkyl-, aryl-, alkaryl- and aralkyl-amines such as methylamine, ethylamine, propylamine, butylamine, triethanolamine, amylamine, hexylamine, 2,4-dimethylaniline, 2,3-dimethylaniline, o-, m- and p-toluidine, benzylamine, aminopyridine, N,N'-dimethylethylenediamine, N,N'-diethylethylenediamine, N,N'-dibenzylethylenediamine, N,N'-diethyl-1,3-propanediamine, N,N'-diethyl-2-butene-1,4-diamine, N,N'-dimethyl-1,6-hexanediamine, piperazine, 4,4'-trimethylenedipiperidine, 4,4'-ethylenedipiperidine, p-N,N-dimethylaminophenethanol and p-N,N-dimethylaminobenzonitrile; aminoaldehydes such as p-N,N-dimethylaminobenzaldehyde, p-N,N-diethylaminobenzaldehyde, 9-julolidine carboxaldehyde and 4-morpholinobenzaldehyde; and aminosilanes such as trimethylsilylmorpholine, trimethylsilylpiperidine, bis(dimethylamino)diphenylsilane, tris(dimethylamino)methylsilane, N,N-diethylaminotrimethylsilane, tris-(dimethylamino)phenylsilane, tris(methylsilyl)amine, tris(dimethylsilyl)amine, bis(dimethylsilyl)amine, N,N-bis(dimethylsilyl)aniline, N-phenyl-N-dimethylsilylaniline and N,N-dimethyl-N-dimethylsilylamine. Tertiary aromatic alkylamines, particularly those having at least one electron-withdrawing group on the aromatic ring, have been found to provide especially good shelf stability. Good shelf stability has also been obtained using amines that are solids at room temperature.

Preferred amide donor compounds include N,N-dimethylacetamide, N,N-diethylacetamide, N-methyl-N-phenylacetamide, hexamethylphosphoramide, hexaethylphosphoramide, hexapropylphosphoramide, trimorpholinophosphine oxide and tripiperidinophosphine oxide.

Suitable ether donor compounds include 4,4'-dimethoxybiphenyl, 1,2,4-trimethoxybenzene and 1,2,4,5,-tetramethoxybenzene.

Suitable urea donor compounds include N,N'-dimethylurea, N,N-dimethylurea, N,N'-diphenylurea, tetramethylthiourea, tetraethylthiourea, tetra-n-butylthiourea, N,N-di-n-butylthiourea, N,N'-di-n-butylthiourea, N,N-diphenylthiourea and N,N'-diphenyl-N,N'-diethylthiourea.

The three components of the photoinitiator system are present in "photochemically effective amounts", that is, amounts of each component sufficient to enable the binder to undergo photochemical hardening upon exposure to light of the desired wavelength. Preferably, for every 100 parts of monomer, the binder of the invention contains about 0.005 to about 10 parts (more preferably about 0.1 to about 4 parts) each of iodonium salt, sensitizer and donor. The amounts of each component are independently variable and thus need not be equal, with larger amounts generally providing faster cure, but shorter shelf life. Sensitizers with high extinction coefficients (e.g., above about 10,000) at the desired wavelength of irradiation for photopolymerization generally are used in reduced amounts.

The binders of the invention can contain a wide variety of adjuvants depending upon the desired end use. Suitable adjuvants include solvents, diluents, resins, thermally-cured binders, plasticizers, pigments, dyes, inorganic or organic reinforcing or extending fillers (at preferred amounts of about 10% to about 90% by weight, based on the total weight of the composition), thixotropic agents, indicators, inhibitors, stabilizers, UV absorbers, and the like. The amounts and types of such adjuvants, and their manner of addition to a composition of the invention will be familiar to those skilled in the art.

The binders of the invention can be cured using a variety of methods. It is convenient to employ light sources that emit ultraviolet or visible light such as quartz halogen lamps, tungsten-halogen lamps, mercury arcs, carbon arcs, low-, medium-, and high-pressure mercury lamps, plasma arcs, light emitting diodes and lasers. Electron beam ("E-beam") irradiation and other curing devices that do not depend on light emission can also be employed. In general, heat or an inert atmosphere will accelerate cure.

The following examples are offered to aid in understanding the invention and are not to be construed as limiting the scope thereof. Unless otherwise indicated, all parts and percentages are by weight.

EXAMPLE 1

Three stock solutions were prepared from 0.25 parts camphorquinone (CPQ), 50 parts triethyleneglycol dimethacrylate (TEGDMA) and 50 parts bisphenol A diglycidyl ether dimethacrylate (BisGMA). 0.50 Part diphenyliodonium hexafluorophosphate ($\phi_2I^+PF_6^-$) was added to the first solution. 0.25 Part sodium p-toluenesulfinate (STS) was added to the second solution. 0.50 Part $\phi_2I^+PF_6^-$ and 0.25 part STS were added to the third solution. Each solution was poured into a 6mm diameter "Teflon" mold to a depth of 2.5 mm, covered with polyester film and irradiated for 10 seconds using a handheld visible light curing lamp ("Visilux", 3M) whose lightguide output end was placed directly on the polyester film.

The solutions containing only CPQ and $\phi_2I^+PF_6^-$ or CPQ and STS formed a soft gel. The solution containing CPS, $\phi_2I^+PF_6^-$ and STS hardened to a solid having a Barcol hardness of 40 (ASTM D-2583) on both its top and bottom surfaces.

In a further experiment, three stock solutions were prepared from 11.85 parts each of the above monomers, 76 parts filler, and 0.25 part CPQ. 0.25 Part $\phi_2I^+PF_6^-$ was added to the first solution. 0.25 Part N,N-dimethylaminophenethyl alcohol ("D-1") was added to the second solution. 0.25 Part $\phi_2I^+PF_6^-$ and 0.25 part D-1 were added to the third solution. Each solution was cured in a mold as described above, but using a 6mm deep mold and a 20 second cure time. The solution containing only $\phi_2I^+PF_6^-$ did not cure. The solution containing only D-1 had top and bottom Barcol hardness values of 56 and 2, respectively. The solution containing both $\phi_2I^+PF_6^-$ and D-1 had top and bottom Barcol hardness values of 60 and 30, respectively.

The above data illustrates that an increased degree of polymerization and depth of cure can be obtained using a binder of the invention.

EXAMPLE 2

Equimolar amounts of a variety of donors were added to monomer stock solutions containing 50 parts trimethylolpropane trimethacrylate, 50 parts 1,4-butanediol dimethacrylate, 0.25 parts CPQ and optionally 0.5 part of the iodonium salts $\phi_2I^+PF_6^-$.

The resulting solutions were irradiated with visible light at an intensity of 60 mW/cm$^2$ (as measured by a United Detector Technology Model 351 portable photometer/radiometer) at 400–500 nm. The solutions were stirred using a glass rod and the time required to reach the gelation point was recorded. Set out below in TABLE I are the run number, donor compound, $E_{ox}$ (donor), weight percent donor, and gel times for solutions prepared with and without the iodonium salt. The donors are listed in TABLE I in order of generally decreasing oxidation potential.

TABLE I

| | | | | Gel time, seconds | |
|---|---|---|---|---|---|
| Run No. | Donor | $E_{ox}$ (donor) | % donor | Sensitizer/donor | Sensitizer/donor iodonium salt |
| 1 | control | | 0 | >200 | 190 |
| 2 | acetonitrile | 2.60 | 0.124 | >200 | >190 |
| 3 | nitrobenzene | | 0.373 | >200 | >190 |
| 4 | methylethylketone | | 0.218 | >200 | >190 |
| 5 | 2,5-dimethyl-2,4-hexadiene | 2.10 | 0.334 | >200 | >190 |
| 6 | ethylmethylthioacetate | 1.70 | 0.407 | >200 | >190 |
| 7 | p-bromothioanisole | 1.60 | 0.615 | >200 | >190 |

TABLE I-continued

| | | | | Gel time, seconds | |
|---|---|---|---|---|---|
| Run No. | Donor | $E_{ox}$ (donor) | % donor | Sensitizer/donor | Sensitizer/donor iodonium salt |
| 8 | 3,3'-dimethoxybiphenyl | 1.60 | 0.649 | >200 | >190 |
| 9 | tetrahydrofuran | 1.60 | 0.220 | >200 | >190 |
| 10 | hexaethylbenzene | 1.49 | 0.492 | >200 | >190 |
| 11 | methoxyphenylphenylether | | 0.604 | >200 | 188 |
| 12 | p-dimethoxybenzene | 1.34 | 0.418 | 205 | 160 |
| 13 | N,N—dimethylacetamide | 1.32 | 0.264 | 204 | 150 |
| 14 | phenylacetate | 1.30 | 0.413 | >200 | >190 |
| 15 | n-propylamine | 1.30 | 0.200 | 90 | 24 |
| 16 | aniline | 1.28 | 0.282 | >200 | >190 |
| 17 | 1,3-dibutylthiourea | | 0.570 | >200 | 137 |
| 18 | tetramethylurea | | 0.352 | 94 | 101 |
| 19 | tetrabutylthiourea | | 0.909 | 38 | 29 |
| 20 | dipentylamine | 1.22 | 0.477 | 159 | 19 |
| 21 | 1,2,4-trimethoxybenzene | 1.12 | 0.509 | >225 | 55 |
| 22 | hexamethylphosphoramide | 1.00 | 0.543 | 80 | 50 |
| 23 | tripiperdinophosphine oxide | 1.00 | 0.907 | 52 | 40 |
| 24 | trimethylsilylmorpholine | | 0.483 | 112 | 21 |
| 25 | N,N—dimethylbenzylamine | 1.00 | 0.410 | 18 | 8 |
| 26 | tris-dimethylsilylamine | | 0.580 | 108 | 32 |
| 27 | triethanolamine | 0.96 | 0.452 | 17 | 6 |
| 28 | tris(dimethylamino)-phenylsilane | | 0.719 | 15 | 9 |
| 29 | triphenylamine | 0.86 | 0.737 | >200 | >190 |
| 30 | triphenylphosphine | | 0.794 | >200 | 172 |
| 31 | p-dimethylaminobenzaldehyde | 0.70 | 0.452 | 13 | 11 |
| 32 | N,N—dimethyl-p-toluidine | 0.65 | 0.410 | 14 | 7 |
| 33 | p-dimethylaminophenyl alcohol | 0.65 | 0.500 | 13 | 8 |

The above data illustrates that an increased cure rate is obtained using a binder of the invention, and demonstrates the advantage of using donors whose $E_{ox}$ value is less than or equal to that of p-dimethoxybenzene and that have an abstractable hydrogen atom on a carbon or silicon atom alpha to the donor atom.

EXAMPLE 3

An unfilled binder formulation was prepared from the following ingredients:

| | % Solids |
|---|---|
| acrylamide | 43.3 |
| N,N'—methylenebisacrylamide | 4.3 |
| polyvinyl alcohol (m.w. 2000, 75% hydrolyzed) | 51.9 |
| surfactant ("Triton X-100") | 0.5 | made up to 11.5% solids in a 1/1 v/v acetonitrile/water mixture. Using a red safelight, coating samples were prepared by combining 25ml portions of the above stock solution with 0.01g of the sensitizer and optionally adding 0.1 g $\phi_2I^+PF_6^-$ and/or 0.1 g STS. The samples were coated onto gelatin-subbed polyester film using a #18 wire wound rod, dried with a heat gun, then overdried for 2 minutes at 60° C. The coated films were exposed under vacuum through a 21 step sensitivity guide, using a tungsten ("Model 70" Transparency Maker, 3M) or ultraviolet (2Kw Berkey Ascor. Berkey Technical Company) light source. The exposed samples were developed using a 3/20, v/v water/methanol solvent mixture. Relative speed was determined by the number of steps (average of 3 samples) remaining after development. Set out below in TABLE II are the results for the samples exposed in visible light, and set out below in TABLE III are the results for the samples exposed to ultraviolet light. Each exposure was 30 sec. in the visible region or 60 sec. in the ultraviolet region except as noted.

trile/water. To 3 ml portions of this solution in 13×100mm "Pyrex" test tubes were added about 0.02 g of $\phi_2I^+PF_6^-$ and/or a donor compound and enough sensitizer to give an optical density of between 1 and 2,

TABLE II
Visible Light Sensitivity Enhancement

| Run No. | Sensitizer | Sensitizer $\lambda_{max}$, nm | Solid steps Sensitizer/ donor | Sensitizer/ iodonium salt | Sensitizer/ donor/ iodonium salt |
|---|---|---|---|---|---|
| 1 | methylene blue | 661 | (c) | 3 | 12 |
| 2 | toluidine blue | 626 | 6 | (c) | 16 |
| 3 | rose bengal | 548 | (d) | (c) | 16 |
| 4 | phenosafranine | 520 | (d) | (c) | 9 |
| 5 | 1,3-bis(4-dimethylaminobenzilidene)acetone(a) | 434 | (d) | 11 | 17 |
| 6 | tris(bipyridyl)ruthenium(+2) chloride | 453 | (d) | (c) | 12 |
| 7 | crystal violet(b) | 593 | (d) | (c) | 10 |
| 8 | eosin yellow | 517 | (c) | 4 | 12 |
| 9 | 3,3'-dimethylthiocarbocyanine iodide(a) | 553 | (d) | (c) | 12 |

Notes to TABLE II:
(a)5 sec. exposure.
(b)60 sec. exposure.
(c)Image lost during development.
(d)No image formed.

TABLE III
Ultraviolet Light Sensitivity Enhancement

| Run No. | Sensitizer | Sensitizer $\lambda_{max}$, nm | Solid steps Sensitizer/ donor | Sensitizer/ iodonium salt | Sensitizer/ donor/ iodonium salt |
|---|---|---|---|---|---|
| 1 | 2,5-bis(cinamylidene)cyclopentanone | 400 | (b) | (b) | 8 |
| 2 | 4'-methoxybenzylidene-4-nitro-acetophenone | 356 | (b) | (b) | 11 |
| 3 | 2-(4-dimethylaminobenzilidene)-dimethylmalonate | 377 | (b) | (c) | 5 |
| 4 | Michler's ketone(a) | 355 | (b) | 10 | 15 |
| 5 | 2-chlorothioxanthone | 387 | (b) | (c) | 11 |

Notes to TABLE III:
(a)15 Second exposure at 40% power.
(b)No image formed.
(c)Image lost during development.

The above data illustrates that combination of an iodonium salt, sensitizer and donor can increase cure speed by one to two orders of magnitude compared to compositions containing only sensitizer and donor or only sensitizer and iodonium salt.

EXAMPLE 4

To illustrate the effect of $E_{ox}$ (donor) upon cure speed, a series of compositions was evaluated as follows. A monomer stock solution was prepared from 10% pentaerythritol tetraacrylate in 4/1, w/w, acetonitrile/water. as evaluated visually. The solutions were purged with N₂ for 2 minutes before and continuously during light irradiation. The light source was a Kodak "Carousel" Projector lamp equipped with a 440nm filter. Relative speed was determined by measuring gelation time.

Set out below in TABLE IV are the run number, the sensitizers and their $\lambda_{max}$ values, the donor compounds and their $E_{ox}$ values, and the gelation times for solutions containing iodonium salt plus sensitizer, sensitizer plus donor, or iodonium salt plus sensitizer plus donor.

TABLE IV

| Run No. | Sensitizer Identity | $\lambda_{max}$ | Donor(a) | Gel time, sec. Iodonium salt/ sensitizer | Sensitizer/ Donor | Iodonium salt/ sensitizer/ donor |
|---|---|---|---|---|---|---|
| 1 | methylene blue | 661 | STS | (b) | (b) | 10 |
| 2 | thionin | 598 | STS | (b) | (b) | 180 |
| 3 | thionin | 598 | FC | (c) | (c) | <5 |
| 4 | phenosafranine | 520 | STS | (b) | (b) | 15 |
| 5 | rose bengal | 548 | STS | (b) | 30 | <5 |
| 6 | fluorescein | 491 | STS | (b) | (b) | 15 |
| 7 | crystal violet | 588 | STS | (b) | (b) | >300 |
| 8 | crystal violet | 588 | FC | (c) | (c) | 120 |
| 9 | malachite green | 614 | STS | (b) | (b) | >300 |
| 10 | malachite green | 614 | FC | (c) | (c) | 60 |
| 11 | 3,3'-dimethylthiocarbocyanine iodide | 553 | STS | 60 | (b) | 30 |
| 12 | 2,6-bis(4-dimethylaminostyryl)-1-methyl-pyridinium iodide | 490 | STS | (b) | (b) | (b) |
| 13 | 2,6-bis(4-dimethylaminostyryl)-1-methyl-pyridinium iodide | 490 | FC | (c) | (c) | 90 |
| 14 | tris(bipyridyl)ruthenium(+2) chloride | 453 | STS | 60 | 60 | <10 |

TABLE IV-continued

| Run No. | Sensitizer Identity | $\lambda_{max}$ | Donor[a] | Gel time, sec. Iodonium salt/ sensitizer | Sensitizer/ Donor | Iodonium salt/ sensitizer/ donor |
|---|---|---|---|---|---|---|
| 15 | 1-methylaminoanthraquinone | 502 | STS | [b] | [b] | 45 |
| 16 | 1,2,2-tricyano-1-(4-dimethylaminophenyl)ethylene | 525 | STS | [b] | [b] | [b] |
| 17 | 1,2,2-tricyano-1-(4-dimethylaminophenyl)ethylene | 525 | FC | [c] | [c] | 90 |

Notes to TABLE IV:
[a]STS = sodium p-toluenesulfinate ($E_{ox}$ = 0.76); FC = ferrocyanide ($E_{ox}$ = 0.2).
[b]No reaction.
[c]Not determined.

The above data illustrates that when $E_{ox}$ (donor) is decreased, cure speed generally increases (see also TABLE I).

EXAMPLE 5

A polyester cloth backing (woven, spun polyester cloth, 0.03 g/cm², Milliken) was impregnated with resin by saturating the backing with an ultraviolet-light-curable resin mixture made by combining 75 parts epoxyacrylate resin ("Novacure 3500", Interez), 15 parts pentaerythritol triacrylate, 9 parts n-vinyl pyrrolidone and 1 part α,α-dimethoxy-α-phenyl acetophenone, and curing the resin under ultraviolet light in air using an energy density of 0.3 M/cm².

A coated abrasive binder resin was prepared from a 50:50 mixture of the triacrylate of tris-hydroxyethylisocyanurate and the triacrylate of trimethylolpropane, filled to 50S with calcium carbonate. 0.25 Part each of $\phi_2 I^+ PF_6^-$, CPQ and D-1 were mixed into the binder resin.

The resin-impregnated backing was knife-coated with the binder resin at a coating thickness of 0.1mm, then drop-coated with grade 50 Al₂O₃ mineral. The binder was cured under nitrogen in 5 to 10 seconds using a high intensity visible light source (Model F440 with 4V678 lamp, Fusion Systems) operated at a distance of about 15 cm. Microscopic examination of the cured abrasive showed that cure took place throughout the binder, even underneath individual mineral granules. By comparison, if the photoinitiator system was excluded from the resin and a 5Mrad dose of E-beam irradiation (250 Kv acceleration potential) was employed to effect cure, pools of wet uncured resin remained under individual mineral granules and the granules were poorly adhered on the backing.

A sample of the coated abrasive was sized coated with the same resin system, using a coating weight just sufficient to coat the mineral granules. The size coat was cured under the visible light source used to cure the make coat. The resulting control abrasive was evaluated using a reciprocating grinding apparatus ("rocker drum") on a 6mm thick 1018 carbon steel workpiece. After 500 cycles, no shelling was observed and an average of 0.77 g of steel was removed. A comparison abrasive sample was prepared using a make coat that contained the same photoinitiator system (cured using visible light), and a size coat that did not contain the photoinitiator system (cured using E-beam). The comparison abrasive shelled after only 20 cycles and removed only 0.02 g of steel.

Comparable results were obtained when sensitizers such as benzil, 2-chlorothioxanthone and fluorenone were substituted for camphorquinone. Improved uncured resin shelf life and ambient light stability were obtained when donor compounds such as ethyl p-dimethylaminobenzoate, p-dimethylaminobenzaldehyde and p-dimethylaminobenzonitrile were substituted for p-dimethylaminophenethyl alcohol.

The above-described abrasive binder system should be a useful substitute for standard phenolic-based binders, and could offer reduced energy consumption and higher throughput during manufacture.

EXAMPLE 6

An open, preformed, bonded nonwoven web, about 10 mm thick, was formed from air laid 15 denier per filament 40 mm long crimped nylon fibers bonded with a polyisocyanurate resin. The fiber content of the nonwoven web was 145 g/m² and the binder content was 115 g/m².

A slurry of abrasive particles and binder was prepared by stirring together 30 parts bisphenol A diglycidyl ether diacrylate, 30 parts tris-hydroxyethylisocyanurate triacrylate, 30 parts tetraethyleneglycol diacrylate, 10 parts monofunctional acrylate adhesion promoter ("Photomere 6173", Occidental Chemical Corporation), 0.5 parts diphenyliodonium hexafluorphosphate, 0.5 parts benzil, 0.5 parts ethyl-4-dimethylamino benzoate and about 100 parts grade 220 fused aluminum oxide abrasive particles. The slurry was coated onto the bonded nonwoven web using a 2-roll coater, at a coating weight of about 2000 g/m².

The coated nonwoven web was then subjected to high intensity visible light irradiation by passing it eight times (four times each side) at a belt speed of about 3 m/minute and at a lamp distance of about 10 cm through the "Fusion Systems" apparatus used in EXAMPLE 5. The abrasive binder resin cured to a hard resinous state. The abrasive particles were firmly adhered to the open fibrous matrix.

Three 130 mm diameter discs with 13 mm center holes were cut from the coated and cured nonwoven web. The discs were ganged on a spindle and supported by 75 mm diameter flanges. While rotating the discs at 1200 revolutions per minute an aluminum work piece was held against the periphery of the discs. The discs abraded the aluminum workpiece at a very satisfactory rate and produced an acceptable surface finish. The discs performed comparably to abrasive articles made according to the teachings of U.S. Pat. Nos. 2,958,593 and 4,609,380, and had the advantage of being made from a photocured binder rather than a thermally-cured binder.

Various modifications and alterations of this invention will be apparent to those skilled in the art without departing from the scope and spirit of this invention. It should be understood that this invention is not limited to the illustrative embodiments set forth herein.

We claim:

1. A coated abrasive having abrasive granules which are supported on and adherently bonded to a carrier by a photocured binder made by photocuring an addition-polymerizable composition comprising:
  (a) free-radically-polymerizable monomer, and
  (b) photoinitiator system, soluble in said monomer, comprising photochemically effective amounts of
    (i) aryliodonium salt,
    (ii) sensitizing compound capable of absorbing light somewhere within the range of wavelengths between about 300 and about 1000 nanometers and capable of sensitizing 2-methyl-4,6-bis(trichloromethyl)-s-triazine, and
    (iii) electron donor compound,
said donor being different from said sensitizing compound and zero $< E_{ox}$ (donor) $\leq E_{ox}$ (p-dimethoxybenzene).

2. A coated abrasive according to claim 1, wherein said abrasive granules are selected from the group consisting of flint, garnet, aluminum oxide, alumina:zirconia, synthetic ceramic, diamond and silicon carbide.

3. A coated abrasive according to claim 1, wherein said carrier comprises a backing sheet, and said granules are bonded to at least one major surface of said backing sheet by a make coating of a first resinous material and a size coating of a second resinous material, said first and/or said second resinous materials being made by photocuring said binder.

4. A coated abrasive according to claim 3, wherein said backing sheet comprises paper, resin-impregnated cloth, vulcanized fiber or film.

5. A coated abrasive according to claim 3, wherein said first resinous binder comprises said addition-polymerizable composition, and said second resinous binder is selected from the group consisting of said addition-polymerizable composition, varnish, epoxy resin, phenolic resin and polyurethane.

6. A coated abrasive according to claim 3, wherein said first resinous binder is selected from the group consisting of said addition-polymerizable composition, glue, varnish, epoxy resin, phenolic resin and polyurethane, and said second resinous material comprises said addition-polymerizable composition.

7. A coated abrasive according to claim 1, wherein said carrier comprises a low density open web.

8. A coated abrasive according to claim 7, wherein said web comprises a nonwoven web.

9. A coated abrasive according to claim 1, wherein said monomer comprises an acrylated oligomer.

10. A coated abrasive according to claim 1, wherein said monomer comprises the triacrylate of tris-hydroxyethylisocyanurate and/or the triacrylate of trimethylolpropane.

11. A coated abrasive according to claim 1, wherein said aryliodonium salt comprises a diphenyliodonium simple salt or diphenyliodonium metal complex salt.

12. A coated abrasive according to claim 1, wherein said range of wavelengths is about 400 to about 700 nanometers.

13. A coated abrasive according to claim 1, wherein said range of wavelengths is about 400 to about 600 nanometers.

14. A coated abrasive according to claim 1, wherein said sensitizing compound comprises a ketone.

15. A coated abrasive according to claim 14, wherein said sensitizing compound comprises an α-diketone having an extinction coefficient below about 1000 at the wavelength at which said addition-polymerizable composition is irradiated when photopolymerized.

16. A coated abrasive according to claim 14, wherein said sensitizing compound is selected from the group consisting of camphorquinone, benzil, 2-chlorothioxanthone and fluorenone.

17. A coated abrasive according to claim 14, wherein said sensitizing compound has the formula:

where X is CO or $CR^1R^2$, where $R^1$ and $R^2$ can be the same or different, and can be hydrogen, alkyl, alkaryl or aralkyl, b is zero or 1, and A and B can be the same or different and can be substituted or unsubstituted aryl, alkyl, alkaryl or aralkyl groups, or together A and B can form a cyclic structure which can be a substituted or unsubstituted cycloaliphatic, aromatic, heteroaromatic or fused aromatic ring.

18. A coated abrasive according to claim 1, wherein said $E_{ox}$ (donor) is between about 0.5 and 1 volts vs. a saturated calomel electrode.

19. A coated abrasive according to claim 1, wherein said donor is selected from the group consisting of amines, amides, ethers, ureas, ferrocene, sulfinic acids and their salts, salts of ferrocyanide, ascorbic acid and its salts, dithiocarbamic acid and its salts, salts of xanthates, salts or ethylene diamine tetraacetic acid and salts of tetraphenylboronic acid.

20. A coated abrasive according to claim 1, wherein said donor contains a nitrogen, oxygen, phosphorus or sulfur donor atom and an abstractable hydrogen atom bonded to a carbon or silicon atom alpha to said donor atom.

21. A coated abrasive according to claim 1, wherein said donor comprises a tertiary amine containing an aromatic ring.

22. A coated abrasive according to claim 21, wherein there is at least one electron-withdrawing group on said aromatic ring.

23. A coated abrasive according to claim 1, wherein said composition contained, for every 100 parts by weight of said monomer, about 0.005 to about 10 parts by weight each of said aryliodonium salt, said sensitizing compound and said donor.

24. A coated adhesive according to claim 23, wherein said composition contained, for every 100 parts by weight of said monomer, about 0.1 to about 4 parts by weight each of said aryliodonium salt, said sensitizing compound and said donor.

25. A coated abrasive having abrasive granules which are supported on and adherently bonded to a carrier by a photocured binder made by photocuring an addition-polymerizable composition comprising:
  (a) free-radially-polymerizable monomer, and
  (b) photoinitiator system, soluble in said monomer, comprising 0.1 to 4 parts each of
    (i) diphenyliodonium metal complex salt,
    (ii) ketone sensitizing compound capable of absorbing light somewhere within the range of wavelengths between about 400 and about 600 nanometers and capable of sensitizing 2-methyl-4,6-bis(trichloromethyl)-s- triazine, and
    (iii) electron donor compound containing a nitrogen donor atom and having an abstractable hydrogen atom bonded to a carbon or silicon atom alpha to said nitrogen atom.
wherein said donor compound is different from said sensitizing compound and wherein about 0.5 $< E_{ox}$ (donor) $\leq$ about 1 volt vs. a saturated calomel electrode.

26. A method for making coated abrasive products comprising the steps of (A) coating a carrier with abrasive granules and a photocurable binder comprising an addition-polymerizable composition comprising:
(i) free-radially-polymerizable monomer, and
(ii) photoinitiator system, soluble in said monomer, comprising photochemically effective amounts of
  (a) aryliodonium salt,
  (b) sensitizing compound capable of absorbing light somewhere within the range of wavelengths between about 300 and about 1000 nanometers and capable of sensitizing 2-methyl-4,6-bis(trichloromethyl)-s-triazine, and
  (c) electron donor compound, said donor being different from said sensitizing compound and zero $< E_{ox}$ (donor) $\leq E_{ox}$ (p-dimethoxybenzene); and
(B) photocuring said binder by irradiating it with ultraviolet or visible light.

27. A method according to claim 26, wherein said sensitizing compound comprises a ketone having an extinction coefficient below about 1000 at the wavelength of said light.

28. A method according to claim 26, wherein said carrier comprises a backing sheet coated on at least one major surface with a make coat of a first resinous material in liquid form, and between said step (A) and said step (B) are carried out the steps of
  (A1) depositing a plurality of said abrasive granules uniformly over the surface of said make coat of first resinous material;
  (A2) curing said first resinous material to bond said granules adherently to said major surface;
  (S3) coating over said make coat and said granules with a size coat of a second resinous material;
wherein at least one of said first or second resinous materials comprises said photocurable binder and is photocured in said step (B) by said ultraviolet or visible light.

* * * * *

UNITED STATES PATENT AND TRADEMARK OFFICE
CERTIFICATE OF CORRECTION

PATENT NO. : 4,828,583

DATED : MAY 9, 1989

INVENTOR(S) : JOEL D. OXMAN, et al.

It is certified that error appears in the above-identified patent and that said Letters Patent is hereby corrected as shown below:

Col. 1, line 22, "1956°" should be --195°--.

Col. 1, line 46, "Wiss," should be --Wiss.--.

Col. 4, line 54, "formula:" should be followed by
--ACO(X)$_b$B--.

Col. 4, line 66, "ps" should be omitted.

Col. 11, line 26, "M/cm$^2$" should be --J/cm$^2$--.

Col. 11, line 30, "505" should be --50%--.

Col. 11, line 48, "sized" should be --size--.

Col. 11, line 52, "control" should be --coated--.

Col. 14, lines 6-7, "formula:" should be followed by
--ACO(X)$_b$B--.

Col. 14, line 24, "or" should be --of--.

Col. 16, line 15, "(S3)" should be --(A3)--.

Signed and Sealed this

Twelfth Day of December, 1989

*Attest:*

JEFFREY M. SAMUELS

*Attesting Officer*     *Acting Commissioner of Patents and Trademarks*